United States Patent
Miryala et al.

(10) Patent No.: US 11,593,542 B2
(45) Date of Patent: Feb. 28, 2023

(54) SOFT ERROR-MITIGATING SEMICONDUCTOR DESIGN SYSTEM AND ASSOCIATED METHODS

(71) Applicant: Fermi Research Alliance, LLC, Batavia, IL (US)

(72) Inventors: Sandeep Miryala, Sound Beach, NY (US); James Richard Hoff, Wheaton, IL (US); Grzegorz W. Deptuch, Great Neck, NY (US)

(73) Assignee: Fermi Research Alliance, LLC, Batavia, IL (US)

( * ) Notice: Subject to any disclaimer, the term of this patent is extended or adjusted under 35 U.S.C. 154(b) by 33 days.

(21) Appl. No.: 17/187,516

(22) Filed: Feb. 26, 2021

(65) Prior Publication Data
US 2022/0277122 A1   Sep. 1, 2022

(51) Int. Cl.
*G06F 30/327* (2020.01)
*G06F 30/392* (2020.01)
(Continued)

(52) U.S. Cl.
CPC .......... *G06F 30/327* (2020.01); *G06F 30/392* (2020.01); *G06F 30/396* (2020.01); *G06F 2119/02* (2020.01)

(58) Field of Classification Search
USPC ....................................................... 716/100
See application file for complete search history.

(56) References Cited

U.S. PATENT DOCUMENTS

| 9,734,272 B2 * | 8/2017 | Clark | G06F 30/327 |
| 2009/0122812 A1 * | 5/2009 | Steiner | H04J 3/0652 |
| | | | 370/503 |

(Continued)

OTHER PUBLICATIONS

Christiansen, J., et al., "RD Collaboration Proposal: Development of Pixel Readout Integrated Circuits for Extreme Rate and Radiation", RD53 Scientific Committee Paper, Jun. 5, 2013.

(Continued)

*Primary Examiner* — Mohammed Alam
(74) *Attorney, Agent, or Firm* — William A. Harding; Grable Martin Fulton PLLC

(57) ABSTRACT

A soft error-mitigating semiconductor design system and associated methods that tailor circuit design steps to mitigate corruption of data in storage elements (e.g., flip flops) due to Single Events Effects (SEEs). Required storage elements are automatically mapped to triplicated redundant nodes controlled by a voting element that enforces majority-voting logic for fault-free output (i.e., Triple Modular Redundancy (TMR)). Storage elements are also optimally positioned for placement in keeping with SEE-tolerant spacing constraints. Additionally, clock delay insertion (employing either a single global clock or clock triplication) in the TMR specification may introduce useful skew that protects against glitch propagation through the designed device. The resultant layout generated from the TMR configuration may relax constraints imposed on register transfer level (RTL) engineers to make rad-hard designs, as automation introduces TMR storage registers, memory element spacing, and clock delay/triplication with minimal designer input.

6 Claims, 15 Drawing Sheets

(51) Int. Cl.
G06F 30/396 (2020.01)
G06F 119/02 (2020.01)

(56) References Cited

U.S. PATENT DOCUMENTS

2011/0022908 A1* 1/2011 Wang ............... G01R 31/31816
                                                     714/E11.155
2011/0022909 A1* 1/2011 Wang .................... G06F 30/327
                                                     714/E11.155
2013/0305199 A1* 11/2013 He .......................... G06F 30/34
                                                     716/104
2018/0121587 A1* 5/2018 Monga ................ H01L 29/7851

OTHER PUBLICATIONS

Garcia-Sciveres, Mauricio, "RD53A Integrated Circuit Specifications", RD53 Collaboration, Version 3.2, Dec. 13, 2015.
Miryala, Sandeep, et al., "Characterization of Soft Error Rate Against Memory Elements Spacing and Clock Skew in a Logic with Triple Modular Redundancy in a 65nm Process", Topical Workshop on Electronics for Particle Physics (TWEPP2018), Antwerp, Belgium, Sep. 17-21, 2018.
Miryala, Sandeep, "SEE Tolerant Standard Cell Based Design While Guaranteeing Specific Distance Between Memory Elements", Topical Workshops on Electronics for Particle Physics (TWEPP2017), Santa Cruz, California, Sep. 11-14, 2017.
Narasimham, B., et al., "On-Chip Characterization of Single Event Transient Pulse Widths", IEEE Trans. Dev. Mat. Ref., vol. 6, No. 4, Dec. 2006, pp. 542-549.

* cited by examiner

PRIOR ART

SOFT ERROR-MITIGATING SEMICONDUCTOR DESIGN SYSTEM AND ASSOCIATED METHODS

STATEMENT REGARDING FEDERALLY SPONSORED RESEARCH OR DEVELOPMENT

The invention described in this patent application was made with Government support under the Fermi Research Alliance, LLC, Contract Number DE-AC02-07CH11359 awarded by the U.S. Department of Energy. The Government has certain rights in the invention.

FIELD OF THE INVENTION

The present invention relates generally to mitigation of radiation effects on electronic devices and, more particularly, to semiconductor design automation configured to model for mitigation of single event effect (SEE) soft errors.

BACKGROUND OF THE INVENTION

The present invention relates to the field of mitigation of radiation effects on semiconductor devices such as integrated circuits (ICs). Interaction of a circuit's silicon with a single energetic particle (such as a strike by a heavy ion, alpha particle, electron, proton, or neutron) may cause a measurable effect on the circuit, up to and including operational malfunction. An ionizing particle strike may introduce electron-hole pairs in the bulk of a semiconductor device, and these carriers may get collected at device nodes owing to drift and diffusion mechanisms. Such radiation-induced events, also known as Single Event Effects (SEEs), may arise when the collected fraction of charge from ionizing particles is larger than the existing electric charge stored on a device node.

SEEs may be further subclassified as hard errors and soft errors. A hard error introduces permanent damage to a semiconductor device that is impacted by a particle. A soft error, while not fatal to a semiconductor, may adversely change the state of data stored on one or more sequential elements in a digital device and/or may affect the performance of analog components like operational amplifiers, regulators, comparators, and oscillators. Two types of SEE soft errors of particular interest to circuit design engineers are Single Event Upsets (SEUs) and Single Event Transients (SETs).

An SEU is characterized by a single energetic-particle strike causing corruption (e.g., a change of state or "bit flip") of a sequential element such as a storage node/register in a microelectronic device (e.g., a microprocessor, semiconductor memory, or power transistor). An SET is characterized by a single energetic-particle strike causing a momentary voltage spike at a node (e.g., a combinational gate) in an integrated circuit that subsequently propagates to the device output. As used hereinafter, such a false or spurious electronic signal caused by a brief, unwanted surge of electric power may be referred to as a "glitch." The SEE summary schematic 100 of FIG. 1 illustrates SEUs 130 potentially manifesting as output signals of various storage nodes/registers 102 within a device and also illustrates SETs 132 potentially introduced within combinational data paths 140 and/or clock buffers 150 employed within a clock tree 112 of a device.

Single Event Upsets (SEUs) and Single Event Transients (SETs) are common in detector electronics for high-energy physics applications, because such detectors are exposed to energetic ionizing particles from the particle collisions that are inherent to such applications. As high-energy physics advancements move, for example, from the Large Hadron Collider (LHC) to the High Luminosity LHC (HL-LHC) configuration, SEEs have the potential to significantly compromise the reliability of such electronic systems.

The effect of soft errors on circuits may be mitigated at various design levels: technology, cell, or system. At the technology level, for example, Silicon On Insulator (SOI) based devices are resistant to SEEs as the ionizing path in the bulk is quite small compared to planar bulk Complementary Metal-Oxide Semiconductor (CMOS). Also for example, at the cell level, increasing the device node capacitance increases the critical charge to hold the logic state, thereby making the cell less susceptible to SEEs. At the system level, the most prominent methodology for mitigating the impact of soft errors in storage nodes is employment of Triple Modular Redundancy (TMR). TMR is a way of storing the same data on multiple nodes in the circuit design to achieve a fault-tolerant form of system-level redundancy.

In a typical TMR implementation, three systems perform a common computation and the results of each is processed by a majority-voting system to produce a single output. By design, if any one of the three systems fails, the other two systems may be polled by the voting system to identify the failure and, accordingly, to correct and/or mask the fault. FIGS. 1B, 2A, and 2B illustrate an exemplary TMR implementation as known in the art. For example, the D flip-flop 102 shown in FIG. 1B is a memory storage element commonly used in digital designs. Flip-flop 102 features a data input (Din) state 110 and a data output (Dout) state 120. Dout 120 is configured to change state based on Din 110, but only in the presence of a clock signal (Clk) 112. For example, flip-flop 102 may be implemented to only allow the input Din 110 to affect the output Dout 120 state when the clock Clk 112 is HIGH (e.g., set to 1). Thus, D flip-flop 102 may operate as a controlled bi-stable latch with the clock signal at Clk 112 serving as the control signal. Flip-flop 102 may further feature a Set 130 input and a Reset 132 input. A HIGH signal to the Set 130 pin may set output Dout 120 to 1. Conversely, a HIGH signal to the Reset 132 pin may cause output Dout 120 to go to LOW (e.g., reset to 0).

FIG. 2A illustrates employment of D flip-flops in an exemplary TMR implementation 200 as known in the art. Input data Din 210 may be stored in sequential elements (i.e., flip-flops 102(a), 102(b), and 102(c)) on these elements' respective clock edges 112(a), 112(b), and 112(c). The input data Din 210 may be latched on the three flip-flops 102(a), 102(b), 102(c) and a voter element 204 may process the flip-flops' respective outputs Q1 120(a), Q2 120(b), and Q3 120(c) to determine a final output Q 220. As illustrated in the truth table 230 of FIG. 2B, the voter 204 may enforce logic (Q=Q1&Q2 | Q2&Q3 | Q3&Q1) to decide the final output Q 220. Such a TMR implementation 200 may mitigate the effect of an SEE on any one of the storage nodes 102(a), 102(b), 102(c) by ensuring the output Q 220 receives the correct value from the remaining two uncorrupted nodes.

FIG. 3A illustrates an exemplary Single Event Transient (SET) scenario 300 as known in the art. As shown, an ionizing particle strike 302 at a gate in a combinational data path may produce a glitch 304. As described above, the propagation of this glitch 302 forward from the impacted gate is termed an SET. The glitch 304 may be captured in a downstream register(s) 310 if the SET arrives as input 314 during the shared Clk 112 clock edge 320 (a phenomenon referred to as SET latching). As illustrated in FIG. 3B, introduction of clock skew 360 (also referred to as "useful skew") is one known method of avoiding glitch propagation through a microelectronic device. As shown, the clock signal Clk 112 may drive a first clock Clk1 312 on a first storage node 370, while that clock signal Clk 112 may be offset by delay logic 350 before driving a second clock Clk2 314 on a second storage node 372. An ionizing particle strike 362 at a gate in a combinational data path may produce glitch 364. However, this glitch 364 may be masked from downstream node 372 because this SET 364 is not allowed to arrive as input 374 during the Clk 314 clock edge 380.

Although the SEE-mitigating techniques 200 and 360 of FIGS. 2A and 3B, respectively, may be sound in the abstract, a design engineer must be concerned with optimization as a specification is carried to implementation. For example, data replication on multiple nodes comes at the cost of additional area and power consumption. Also for example, a design engineer is burdened to ensure that decisions made regarding implementation of a design specification do not inadvertently defeat operational requirements (e.g., expose more than one storage node in a TMR configuration to corruption by a common SEU; fail to account for an SET in a delay logic/clock buffer itself). In circuit design engineering, logic synthesis is a process by which an abstract specification of required circuit behavior is turned into a design implementation in terms of logic gates. Design implementation details are commonly defined at the register transfer level (RTL) using a computer program called a synthesis tool. RTL is a design abstraction that models a synchronous digital circuit in terms of the flow of digital signals (data) between hardware registers, and the logical operations performed on those signals. RTL abstraction is used in hardware description languages (HDLs) like Verilog and Very High-Speed Integrated Circuit Hardware Description Language (VHDL) to create high-level representations of a circuit from which lower-level representations and, ultimately, actual wiring configurations may be derived.

Accordingly, a need exists for a solution to at least one of the aforementioned challenges in circuit design specification and optimization. More specifically, a need exists for an automated methodology that equips circuit design engineers to more easily, quickly, and/or correctly produce SEE-tolerant standard cell-based digital designs. These are all features and capabilities of the present invention as disclosed and claimed, which provides solutions to the multiple shortcomings of prior art inventions in this field.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a soft error-mitigating semiconductor design system and associated method(s) to provide automated circuit design tailored to mitigate SEEs manifesting as soft errors. Embodiments of the present invention may advantageously improve known TMR automation methodology for SEU mitigation by introducing additional stages/steps to map requirement-driven registers with triplicated cells during synthesis and also with additional spacing constraints during placement and routing to optimize distance between memory elements in a TMR. Additionally, clock delay insertion and/or clock triplication may be applied during clock tree distribution to augment the TMR specification for SET mitigation.

In one embodiment of the present invention, a soft error-mitigating semiconductor design system comprising a synthesis subsystem configured to receive a circuit design specification represented in a hardware description language (e.g., Verilog, Very High-Speed Integrated Circuit Hardware Description Language (VHDL)). The circuit design specification may comprise one or more sequential element definitions (e.g., storage nodes, such as flip-flops). Using the sequential element definition(s) as input, the synthesis subsystem may generate a triple modular redundancy (TMR) configuration that may apply three redundant sequential elements to implement each desired sequential element in a design. The TMR configuration may further comprise a voter element definition configured to receive a respective output from each of the three redundant sequential element definitions and to generate, using majority-voting logic, a fault-free output. The TMR configuration may be written to a netlist generated by the synthesis subsystem.

The soft error-mitigating semiconductor design system may further comprise a physical design subsystem configured to receive the netlist and determine a spatial separation to be applied to the three redundant sequential elements in the TMR configuration. The spatial separation definition may employ an SEE-mitigating spacing constraint. In addition, the physical design subsystem may be configured to determine a useful clock skew to insert into the TMR configuration. In one embodiment, the clock skew insertion definition may comprise a single global clock signal configured to drive each of three delay logic elements. Each of three delay logic elements may be characterized by a respective offset that is distinct from each other's offset (i.e., the delay offsets are distinct). In another embodiment, the clock skew insertion definition may comprise three clock signals each configured to drive a respective one of three delay logic elements. Once again, each of three delay logic elements may be characterized by a respective offset that is distinct. The physical design subsystem may generate a layout from the TMR configuration and including the spatial separation definition and the applied clock skew insertion definition.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout all views of the Figures (i.e., parts are not re-numbered for identification in different Figures).

DETAILED DESCRIPTION OF THE INVENTION

Figure 1A:
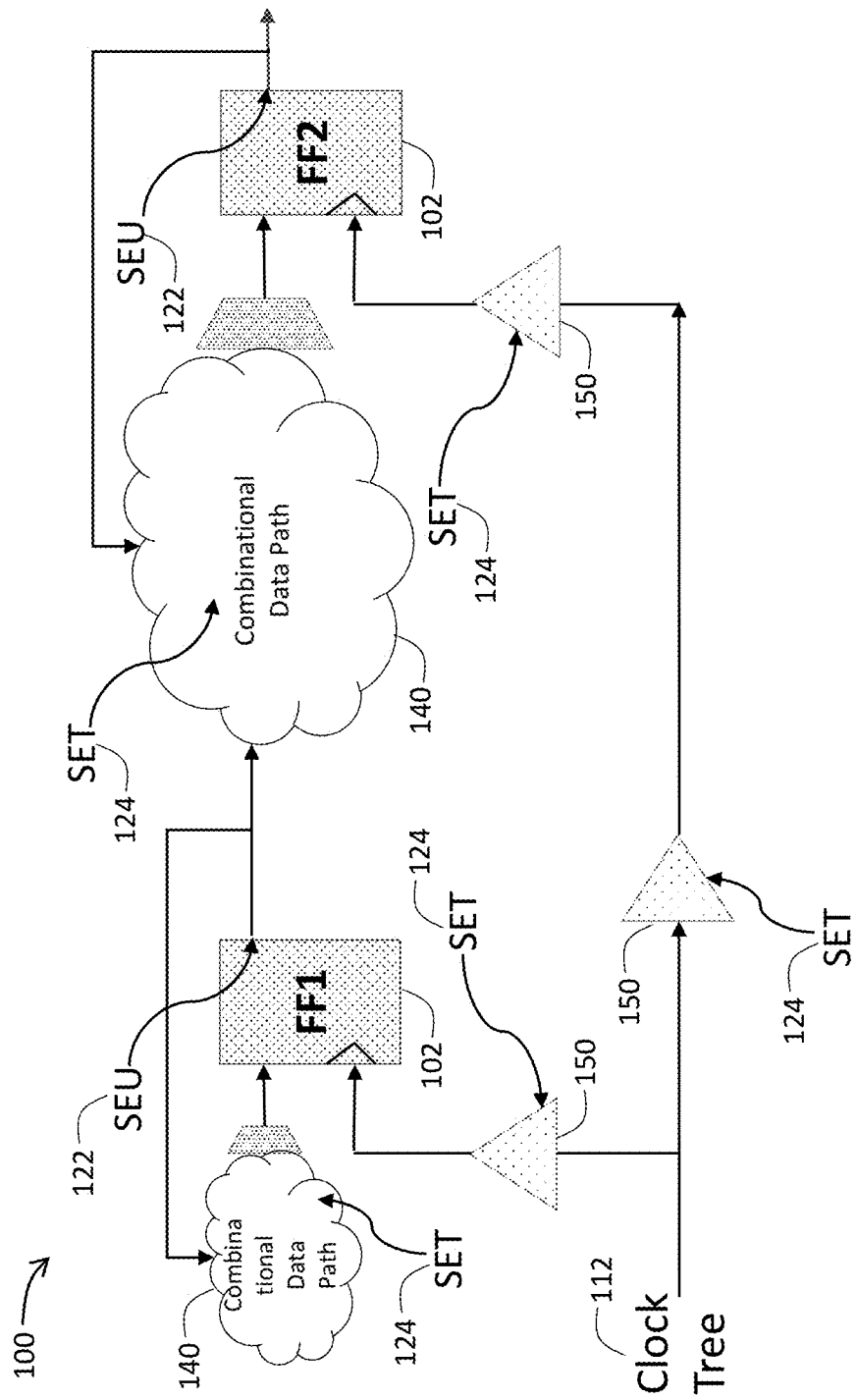
FIG. 1A is a schematic diagram illustrating Single Event Effect (SEE) impact points in exemplary digital logic according to the prior art.
Figure 1B:
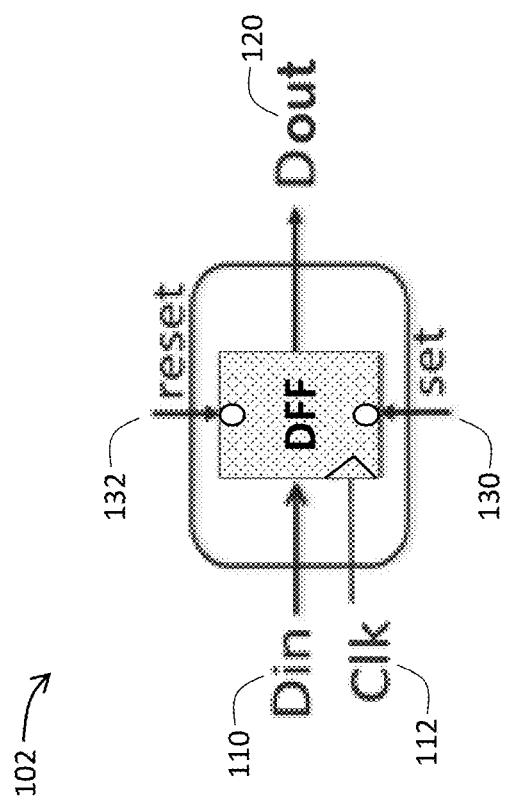
FIG. 1B is a schematic diagram illustrating an exemplary D-flip flop specification according to the prior art.

The present invention will now be described more fully hereinafter with reference to the accompanying drawings, in which preferred and alternative embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those of ordinary skill in the art.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

As used herein, the word "exemplary" or "illustrative" or "shown" means "serving as an example, instance, or illustration." Any implementation described herein as "exemplary" or "illustrative" is not necessarily to be construed as preferred or advantageous over other implementations. All of the implementations described below are exemplary implementations provided to enable persons of ordinary skill in the art to make or use the embodiments of the disclosure without undue experimentation or a degree of experimentation beyond that which is customary in the art, and are not intended to limit the scope of the disclosure, which is defined by the claims.

Referring to FIGS. 4, 5A, 5B, 6, 7, 8A, 8B, 8C, 8D, 9, 10 and 11, a soft error-mitigating semiconductor design system and associated method according to an embodiment of the present invention is now described in detail. Throughout this disclosure, the present invention may be referred to as a soft error-mitigating semiconductor design system, tool, or method; a SEE-mitigating design system, tool, or method; a semiconductor design system, tool, or method; a design system, tool, or method; or a system, a tool, and/or a method. Those skilled in the art will appreciate that this terminology is only illustrative and does not affect the scope of the invention. For instance, the present invention may just as easily relate to any computer-assisted methodology for standard cell-based digital design.

A person of skill in the art will immediately recognize that development of large digital designs may be made more manageable by employment of computer-aided design (CAD) tools to translate a behavioral circuit description into a desired logic. Electronic computer-aided design (ECAD), also referred to as electronic design automation (EDA), is a category of software tools for designing electronic systems such as integrated circuits and printed circuit boards. Because a modern semiconductor chip may comprise billions of components, EDA tools are essential for successful design of complex solutions. Such tools often work together in a design flow that chip designers may use to design and analyze entire semiconductor chips.

SEE Tolerant Design

Figures 2A, 2B:
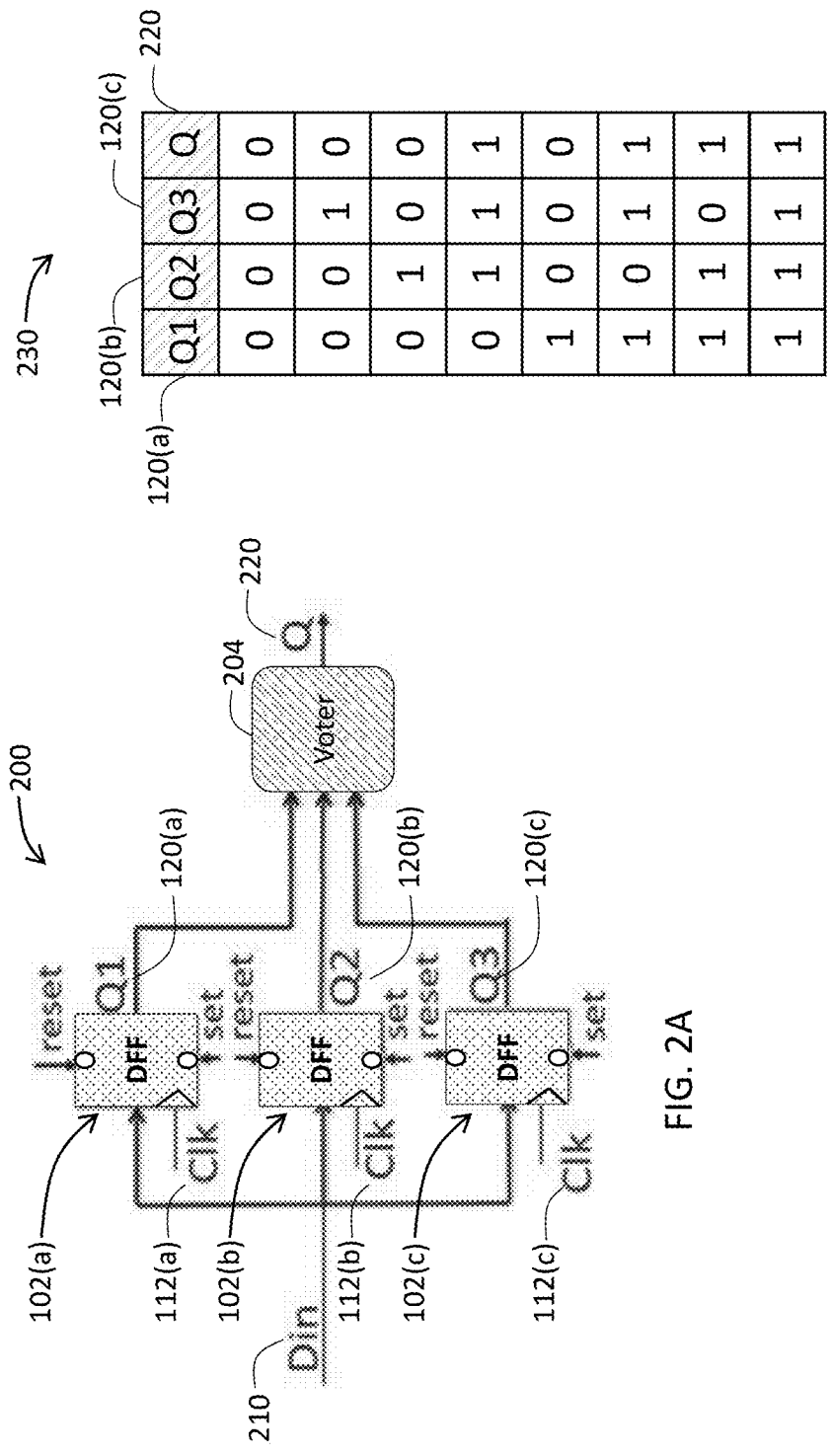
FIG. 2A is a schematic diagram illustrating an exemplary triple modular redundancy (TMR) specification according to the prior art.
FIG. 2B is a truth table illustrating exemplary operation of the TMR specification of FIG. 2A.
Figures 3A, 3B:
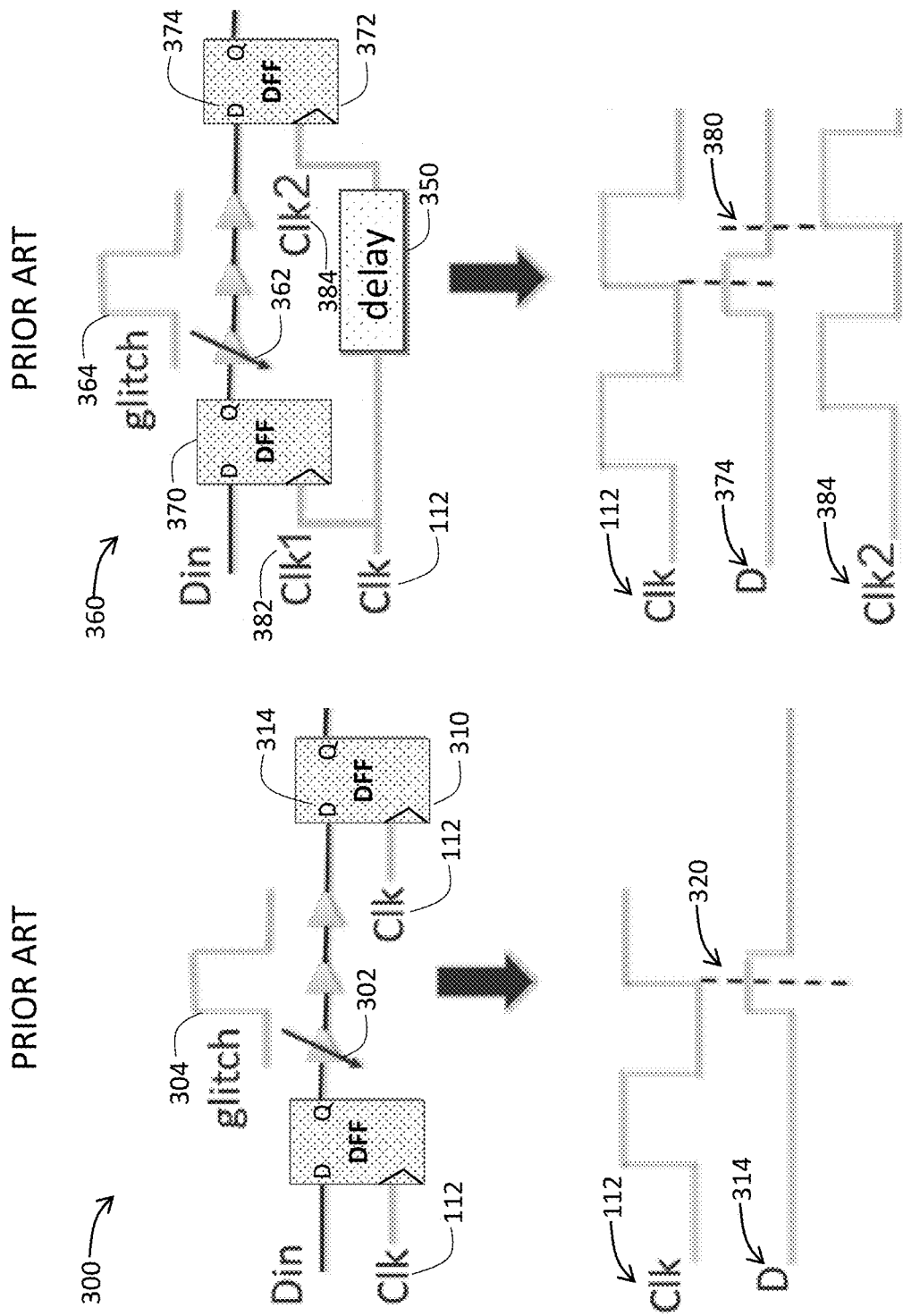
FIG. 3A is a schematic diagram illustrating an exemplary SET latching specification and latching timing model according to the prior art.
FIG. 3B is a schematic diagram illustrating an exemplary clock skew specification and skew timing model according to the prior art.
Figure 4:
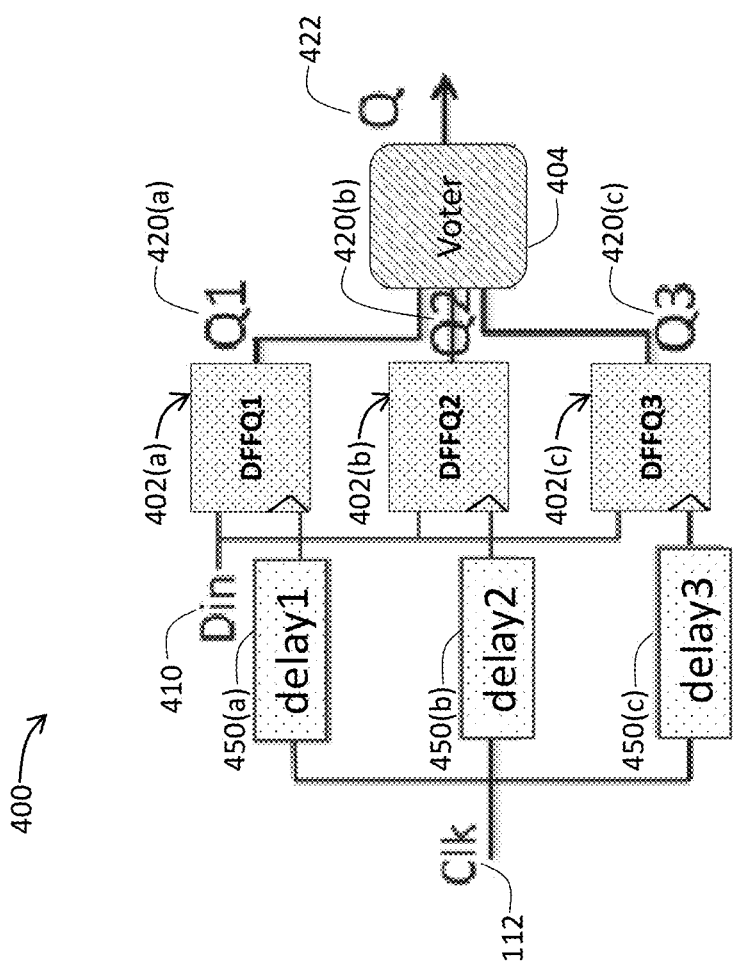
FIG. 4 is a schematic diagram illustrating delay insertion in a TMR node specification with single clock according to an embodiment of the present invention.

Referring initially to FIG. 4, a circuit design characterized by triple modular redundancy (TMR) with clock skew/delay according to an embodiment of the present invention will now be described in detail. For example, and without limitation, the basic design 400 may be configured to receive an input data Din 410 that may be stored in sequential elements (i.e., flip-flops 402(a), 402(b), and 402(c)) on these elements' respective clock edges, which each may be offset from a global clock signal Clk 112 by respective delay logic 450(a), 450(b), 450(c) of differing delay values. The input data Din 410 may be latched on the three flip-flops 402(a), 402(b), 402(c) and a voter element 404 may process the flip-flops' respective outputs Q1 420(a), Q2 420(b), and Q3 420(c) to determine a final output Q 422. Similar to in the truth table 230 of FIG. 2B, the voter 404 may enforce logic (Q=Q1&Q2 | Q2&Q3 | Q3&Q1) and, in doing so, may mitigate the effect of an SEE on any one of the storage nodes 402(a), 402(b), 402(c) by ensuring the output Q 422 receives the correct value from the remaining two non-corrupted nodes. Additionally, introduction of the useful clock skews 450(a), 450(b), 450(c) in line with flip-flops 402(a), 402(b), 402(c) may prevent a glitch introduced at input Din 410 from propagating through the system 400 by masking the glitch from a majority of the storage nodes 402(a), 402(b), 402(c).

Figure 5A:
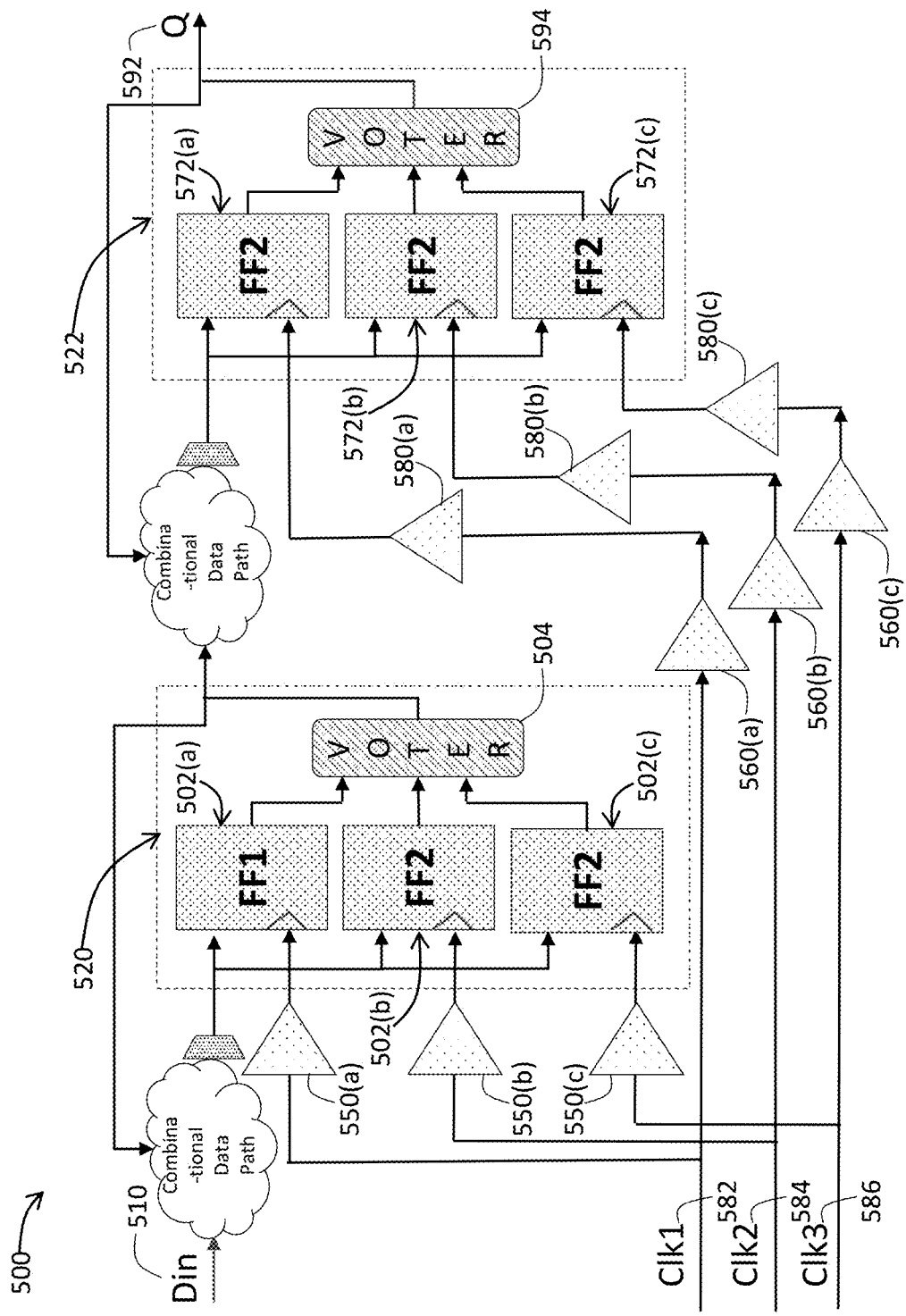
FIG. 5A is a schematic diagram illustrating delay insertion in a TMR multi-module specification with clock triplication according to an embodiment of the present invention.

Referring now to FIG. 5A, a circuit design characterized by multi-module triple modular redundancy (TMR) with delay employed in clock triplication according to an embodiment of the present invention will now be described in detail. For example, and without limitation, the advanced design 500 may be configured to receive an input data Din 510 that may be input (either directly, or after manipulation by other combinational data path logic) to multiple TMR modules 520, 522. Each module may be characterized by the general configuration 400 illustrated in FIG. 4. More specifically, module 520 may comprise sequential elements (i.e., flip-flops 502(a), 502(b), and 502(c)) configured to receive input on their respective clock edges, each of which may be offset from a respective driving clock signal by respective delay logic 550(a), 550(b), 550(c) of differing delay values. Voter element 504 may process the module 520 flip-flops' respective outputs to determine a final output for module 520. Similarly, module 522 may comprise sequential elements (i.e., flip-flops 572(a), 572(b), and 572(c)) configured to receive input on their respective clock edges, each of which may be offset from a respective driving clock signal by respective delay logic 580(a), 580(b), 580(c) of differing delay values. Voter element 594 may process the module 522 flip-flops' respective outputs to determine a final output for module 522. Similar to in the truth table 230 of FIG. 2B, the voters 504, 594 may enforce logic (Q=Q1&Q2 | Q2&Q3 | Q3&Q1) and, in doing so, may mitigate the effect of an SEE on any one of the storage nodes in either module 520, 522. Additionally, triplication of clocks Clk1 582, Clk2 584, and Clk3 586 may be employed to advantageously facilitate driving clock signal asynchrony to prevent glitch propagation. Furthermore, introduction of differing useful clock skews may provide additional SET mitigation. For example, and without limitation, FIG. 5A illustrates Clk1 582 driving storage node 502(a) through single delay 550(a), Clk2 584 driving storage node 502(b) through single delay 550(b), and Clk3 586 driving storage node 502(c) through single delay 550(c). FIG. 5A also illustrates Clk1 582 driving storage node 572(a) through two delays 560(a), 580(a); Clk2 584 driving storage node 572(b) through two delays 560(b), 580(b); and Clk3 586 driving storage node 572(c) through two delays 560(c), 580(c).

Figure 5B:
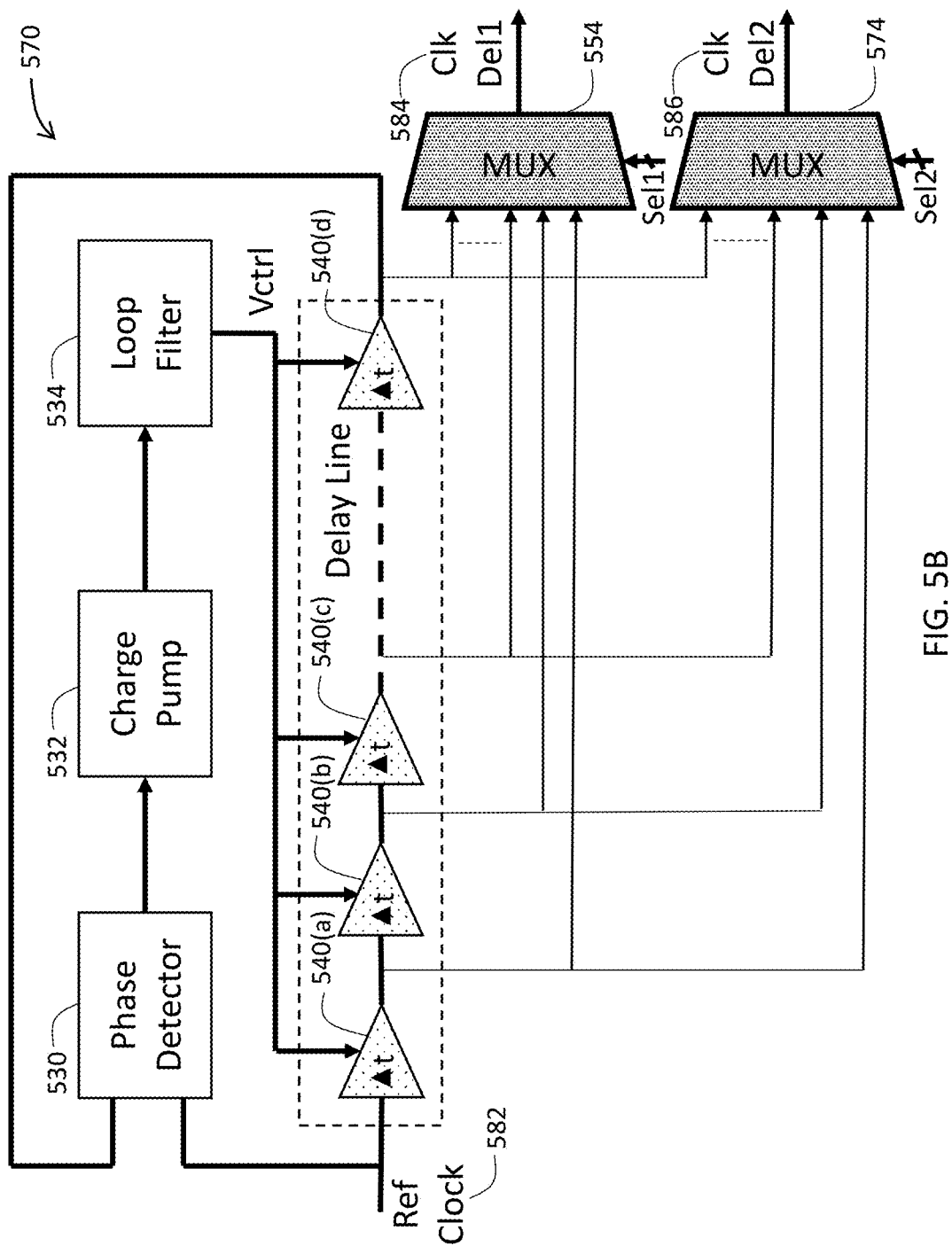
FIG. 5B is a schematic diagram illustrating clock triplication generated from a single global clock according to an embodiment of the present invention.

Still referring to FIG. 5A, and referring additionally to FIG. 5B, a circuit design characterized by clock triplication implemented as phases generated from a global clock according to an embodiment of the present invention will now be described in detail. Instead of, or in addition to, employing multiple clocks (illustrated as Clk1 582, Clk2 584, and Clk3 586 in FIG. 5A) in the present invention, a phase generation design such as a delay locked loop (DLL) or a phase locked loop (PLL) may be employed. For example, and without limitation, the single DLL design 570 of FIG. 5B may be configured to receive a global clock signal 584 and to precisely delay the travel of clock transitions down a line of delay elements 540(a), 540(b), 540(c), 540(d). The delay may be controlled by circuitry which compares the input global (or reference) clock with the output of the delay line and adjusts the delay of the delay elements until they match, meaning the total delay of the delay line may be one clock period. One possible configuration of circuitry of a DLL that may manage the delay line may include a phase detector (or phase frequency detector) 530, a charge pump 532, and a loop filter 534. A person of skill in the art will immediately recognize that alternative DLL configurations, and/or alternative phase generation systems altogether, may be similarly employed as part of the present invention. In the example design of FIG. 5B, the output of each of the delay elements selected for inclusion in the delay line may be directed to some number of multiplexers (not necessarily limited to two multiplexers 554, 574 as shown) to facilitate selection of the Δt between delay element stages. A person of skill in the art will immediately recognize that multiplexers are optional in a working DLL design. Operation of the DLL design 570 may generate a Clk Del1 584 and a Clk Del2 586 from the global Ref Clock 582. In this manner, clock triplication 582, 584, 586 may be achieved from a single clock.

Figure 6:
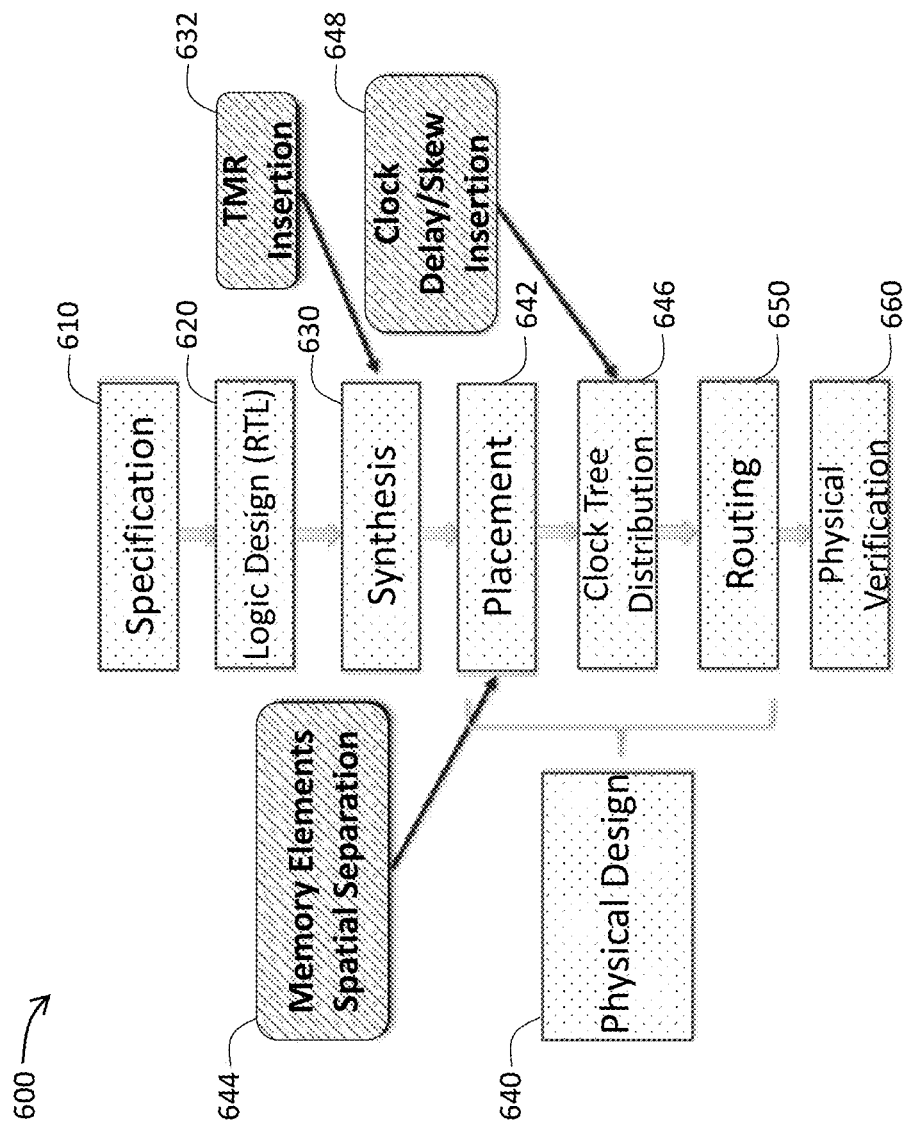
FIG. 6 is a block diagram describing a soft error-mitigating semiconductor design method according to an embodiment of the present invention.

Referring now to FIG. 6, a soft error-mitigating semiconductor design method 600 according to an embodiment of the present invention will now be described in detail. The standard cell-based design method 600 may include automated support for traditional semiconductor design phases, including Specification 610, Logic Design 620, Synthesis 630, Physical Design 640, and Physical Verification 660 phases. Additionally, the method 600 may include semi-custom design flow automation directed to TMR insertion 632 during Synthesis 630, as well as to memory elements spatial separation 644 and to clock delay/skew insertion 648 during Physical Design.

SEE Tolerant Semi-Custom Design Flow

More specifically, the soft error-mitigating semiconductor design method 600 may be characterized by a semi-custom design flow comprising various steps including the following:

1) Specification 610 may comprise using a specification language such as Verilog or VHDL to capture circuit design specifications at a behavioral level. This step may include refining technical requirements for the desired circuit, such as top-level functionality, specific computation algorithm(s) to be implemented, desirable clock frequencies, package type, power supply, communication protocols for external interfaces, and operational temperature range.

2) Logic Design 620 may comprise coding data flow constraints of each functional block in a specified architecture. Functional block types may include combinational logic elements (e.g., Boolean gates), sequential elements (e.g., flip flops, latches), finite state machines (implemented in hardware and/or software), and/or arithmetic logic blocks. During this step, an RTL description of logic design may be expressed in a design language such as Verilog.

3) Synthesis 630 may comprise applying all the above-mentioned behavioral logic constraints to ensure the design meets functionality and speed requirements, and mapping of the design to standard cells in the technology. Logic synthesis may include automatically reducing RTL from the previous step(s) to gate-level logic (e.g., AND, NOT, wires) with the help of a logic library to produce a netlist. By way of definition, a netlist refers herein to a description of the connectivity of an electronic circuit. In its simplest form, a netlist consists of a list of the electronic components in a circuit and a list of the nodes to which these components are connected. A network (net) may be defined as a collection of two or more interconnected components. The structure, complexity and representation of netlists may vary considerably, but the fundamental purpose of any netlist is to convey connectivity information. Netlists often provide instances, nodes, and perhaps some attributes of the components involved.

4) Physical Design 640 includes a number of design decision support steps, many of which may be supported by automation, and that ultimately produce a layout that is ready to support circuit fabrication. Of particular interest in the context of the present invention are the steps of floorplan/placement, clock tree distribution, and routing:

4.a) Placement 642 includes optimizing the design for minimum area to allow use of fewer resources and/or to increase the speed of the system.

4.b) Clock Tree Distribution 646 comprises employment of clock(s) to minimize the skew and insertion delay. If clocking is skewed intentionally to improve the setup slack, such a design feature is characterized as useful skew.

4.c) Routing 650 includes calculating delays for fanout of wire in a device.

5) Physical Verification 660 includes checking the correctness of the generated layout design.

TMR implementation is not straightforward in a standard cell-based digital design which uses computer-aided design (CAD) tools for Synthesis and Physical design phases of an ASIC design flow as described above for FIG. 6. As described hereinbelow, certain embodiments of the present invention comprise an automation methodology that may map the intended registers in a design's Verilog RTL with triplicated cells during Synthesis, that may guarantee the minimum distance between memory elements during Placement and Routing, and that may insert complementary clock delay (useful skew), all leading to a SEE-tolerant standard cell-based digital design. As illustrated in FIG. 6, triplication scheme insertion 632 may be carried out during Synthesis 630 itself, whereas the spatial separation 644 between the TMR memory elements may be applied as constraints during Placement 642 and clock skew or delay insertion 648 may be carried out during the Clock Tree Distribution 646 phase of a Physical Design 640. The resultant semi-custom design flow may advantageously mitigate soft errors (SEUs and SETs) in the digital logic realized.

TMR Insertion During Synthesis

Figure 7:
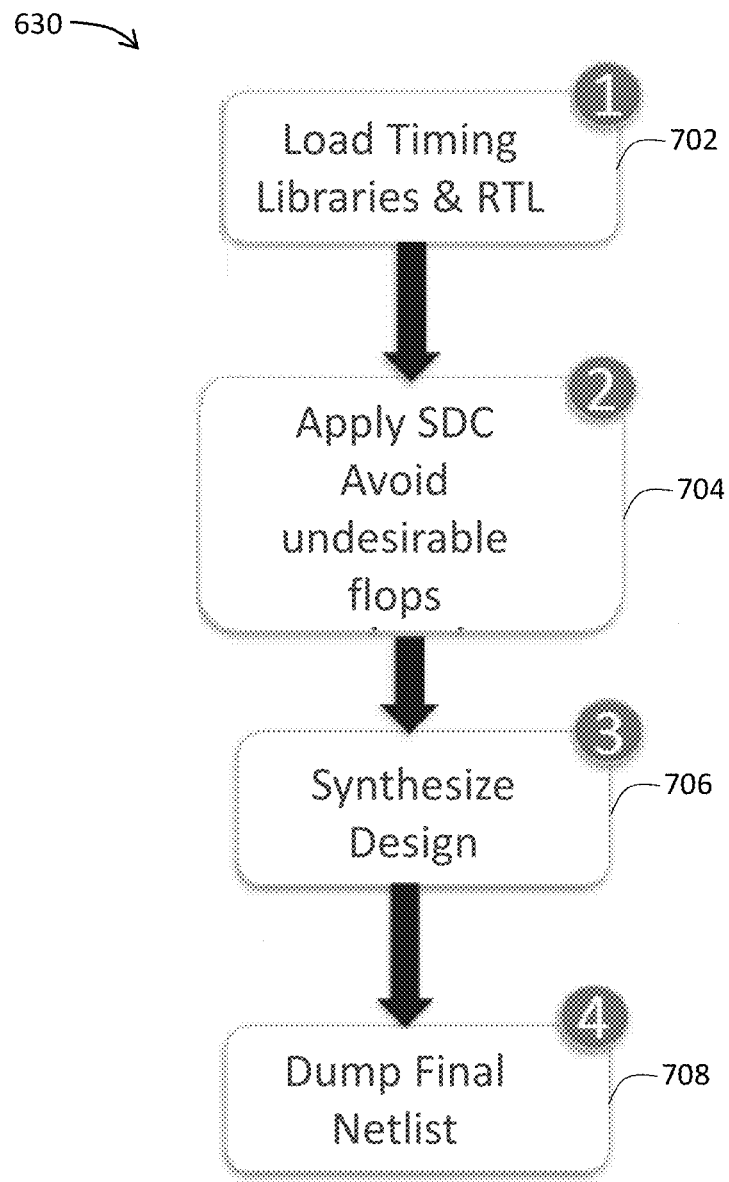
FIG. 7 is a software script implementing exemplary digital design specification steps according to a first embodiment of the present invention.

Referring now to FIG. 7, the Logic Synthesis flow 630 according to an embodiment of the present invention will now be described in detail. Automated steps may comprise 1) Load Timing Libraries and RTL 702, 2) Apply Synopsis Design Constraint (SDC) and set attribute(s) to avoid undesirable flip-flops 704; 3) Synthesis Design 706; and 4) Dump (e.g., Write) Final Netlist 708.

Figure 8A:
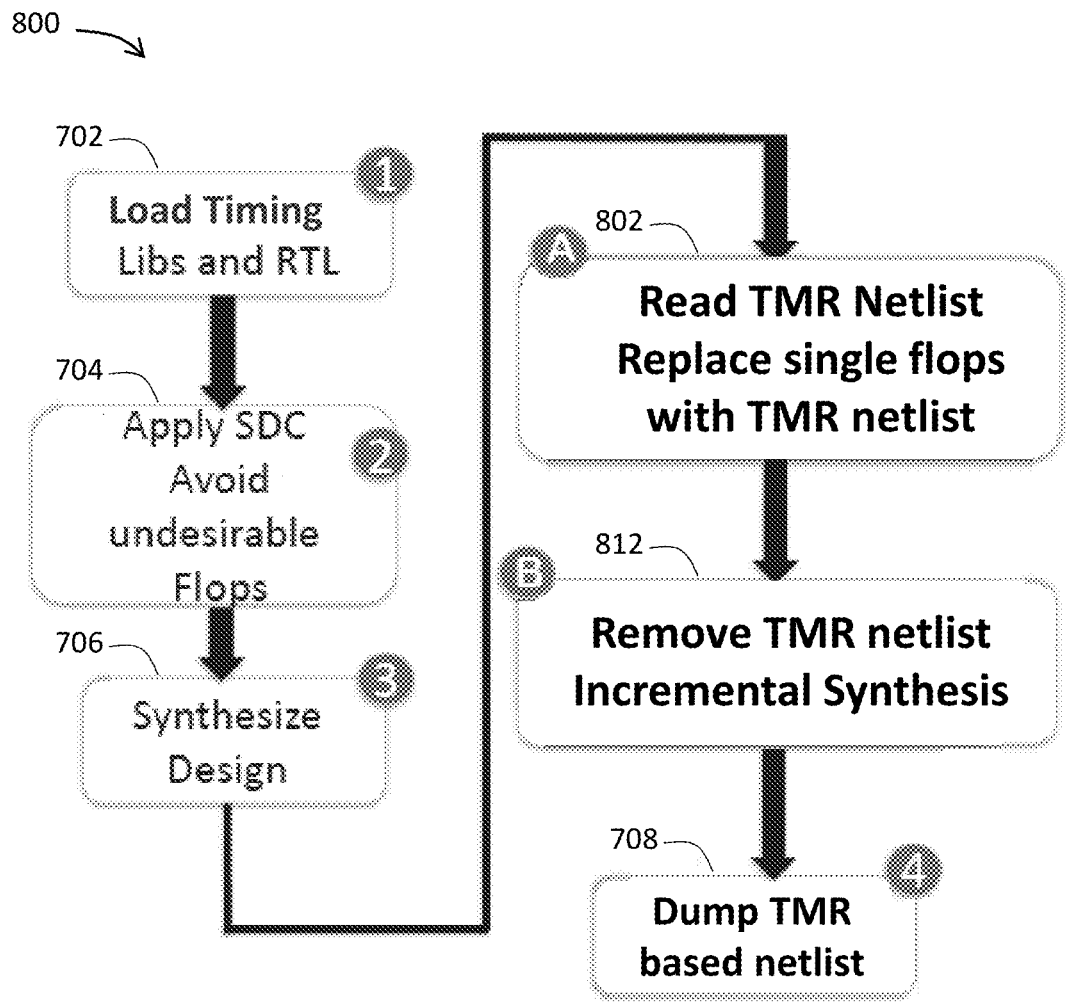
FIG. 8A is a software script implementing exemplary digital design specification steps according to a second embodiment of the present invention.

Referring now to FIG. 8A, a modified Logic Synthesis flow 800 according to an embodiment of the present invention will now be described in detail. In addition to synthesis steps 702, 704, 706, and prior to writing of a final netlist 708, the target registers (e.g., single flops) to be replaced as TMR insertion may be mapped to TMR logic through a reading of the TMR netlist 802. At step 812, incremental synthesis may be performed for further optimization in the TMR logic prior to dumping of the TMR-based netlist (step 708).

Still referring to FIG. 8A, and referring additionally to FIGS. 8B, 8C, and 8D, exemplary implementations of step 802 for replacing single flops with TMR netlist will now be described in detail. For example, and without limitation, in FIG. 8B at line 832, TMR_DFQD.v is a gate level netlist implementing TMR as shown in FIGS. 4 and 5 as described above. The for loop at line 834 of the script may search for all flip-flops that are mapped to DFQD* type whereas the command at line 836 may replace the cell with TMR netlist. Each flip-flop kind in the technology library may have its corresponding TMR gate level netlist.

Figure 8B:
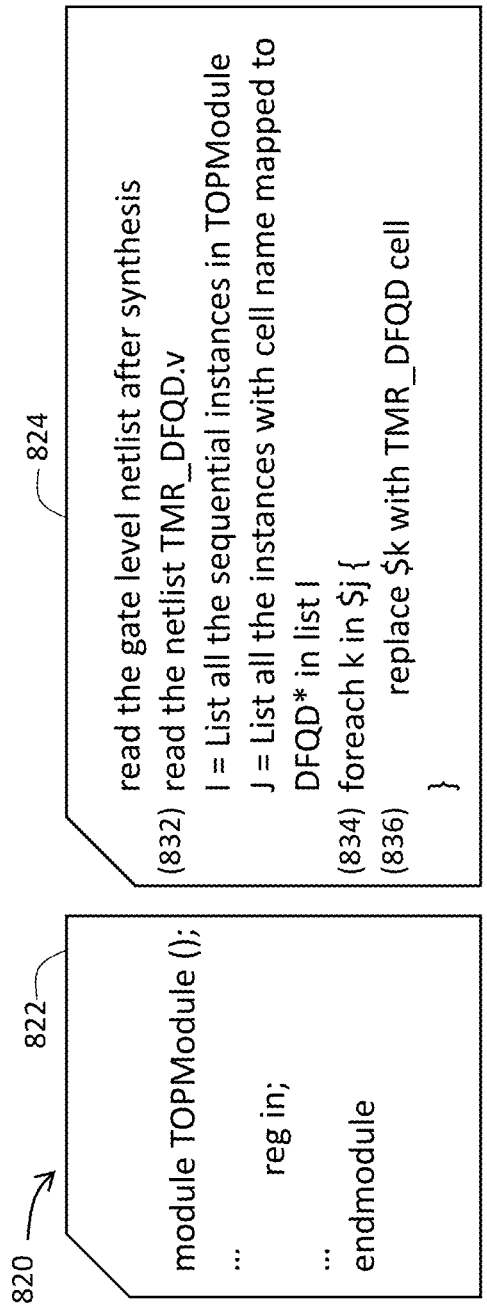
FIGS. 8B, 8C and 8D each is a respective software script implementing a TMR specification according to a respective embodiment of the present invention.
Figure 8C:
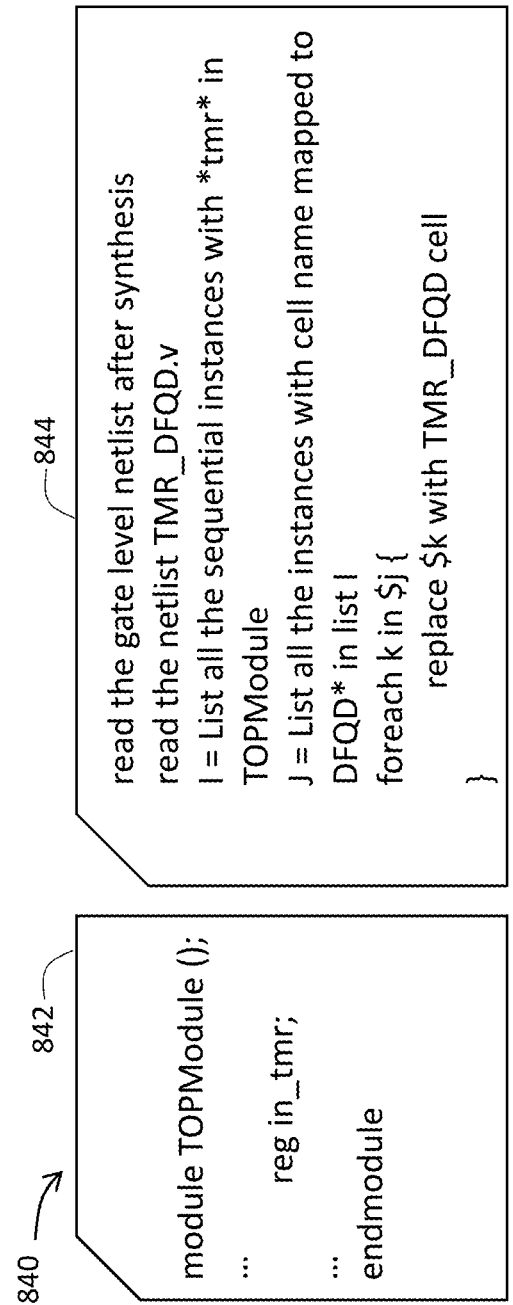
Figure 8D:
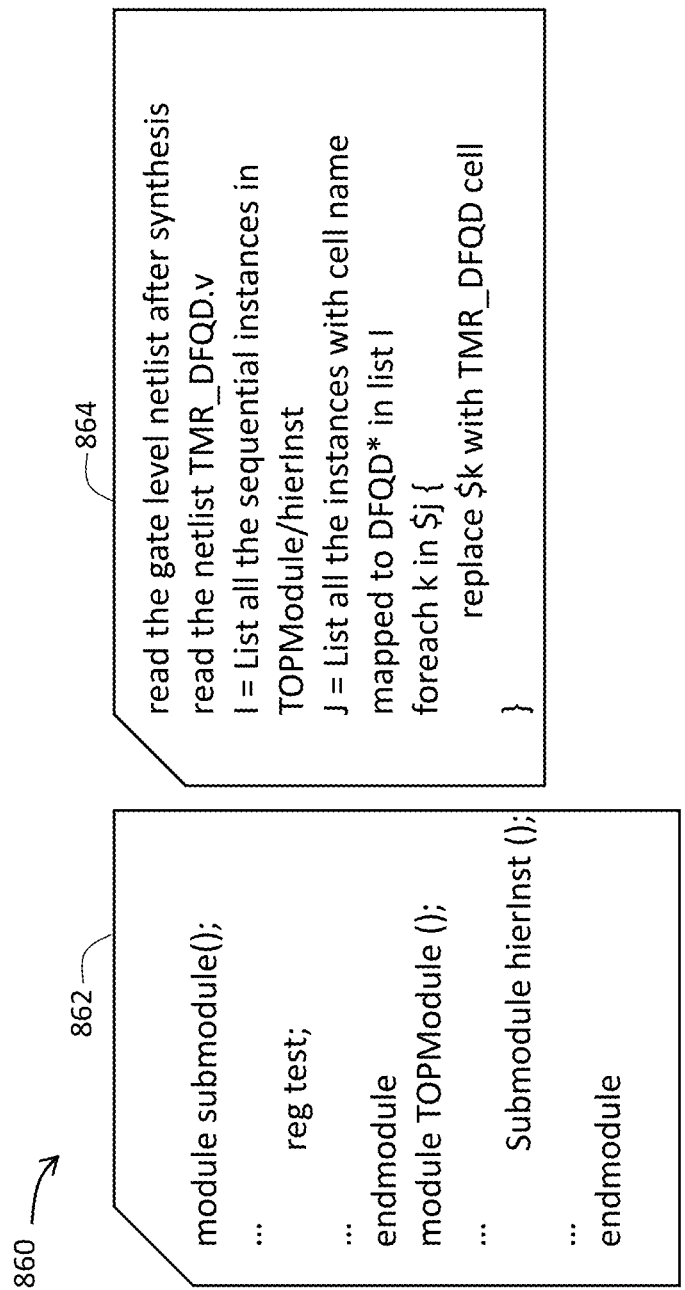

As application of the TMR methodology increases power consumption and area of the digital logic, the floorplan may not allow triplication of every register on the chip (i.e., triplicating all the registers in RTL, as implemented 820 in exemplary rtl code snippet 822 and exemplary TMR algorithm snippet 824 of FIG. 8B). Alternatively, FIGS. 8C and 8D illustrate certain embodiments 840, 860 of the method aspect of the present invention that may support the following cases, respectively, both of which may be advantageous for digital design:

1. Triplicating only those registers that have *tmr* as the instance name in RTL (as implemented 840 in exemplary rtl code snippet 842 and exemplary TMR algorithm snippet 844 of FIG. 8C).

2. Triplicating registers in one of the hierarchical modules in RTL (as implemented 860 in exemplary rtl code snippet 862 and exemplary TMR algorithm snippet 864 of FIG. 8D).

Memory Elements Spatial Separation

Figure 9:
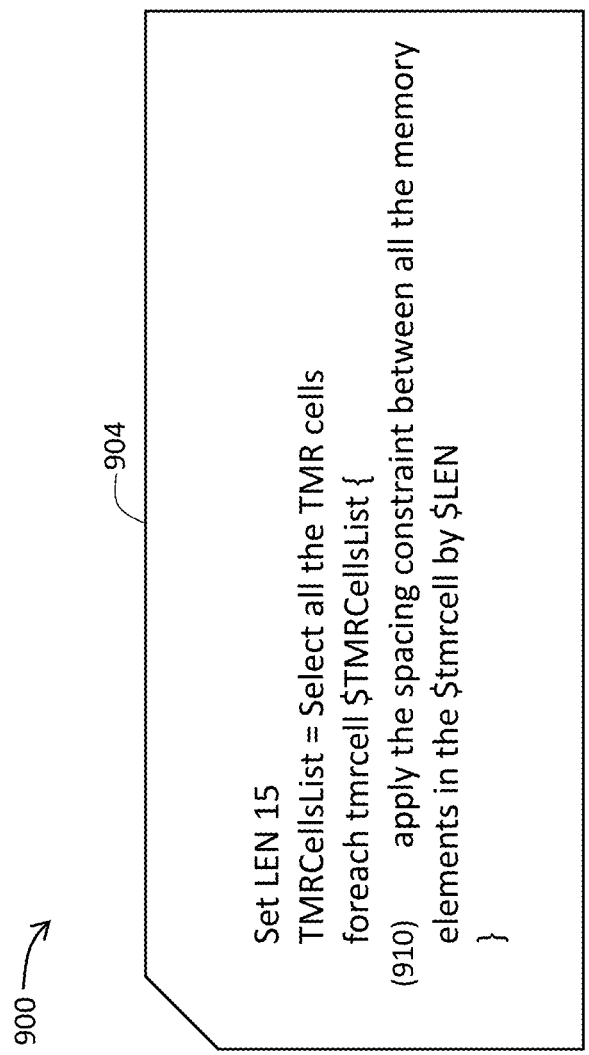
FIG. 9 is a software script implementing memory elements spatial separation according to an embodiment of the present invention.

Referring again to FIG. 6, accomplishment of spatial separation 644 between TMR memory elements during Placement 642 according to embodiments of the present invention will now be described in detail. Referring additionally to FIG. 9, a spacing method 900 may advantageously place sequential elements in the TMR such that these nodes are separated spatially in the floorplan by a significant distance to ensure that only one node may be affected by an ionizing particle. As shown in the exemplary script 904 at line 910, the spacing command may enable putting such a spacing constraint on a selected TMR module.

Clock Delay Insertion/Clock Triplication

Figure 10:
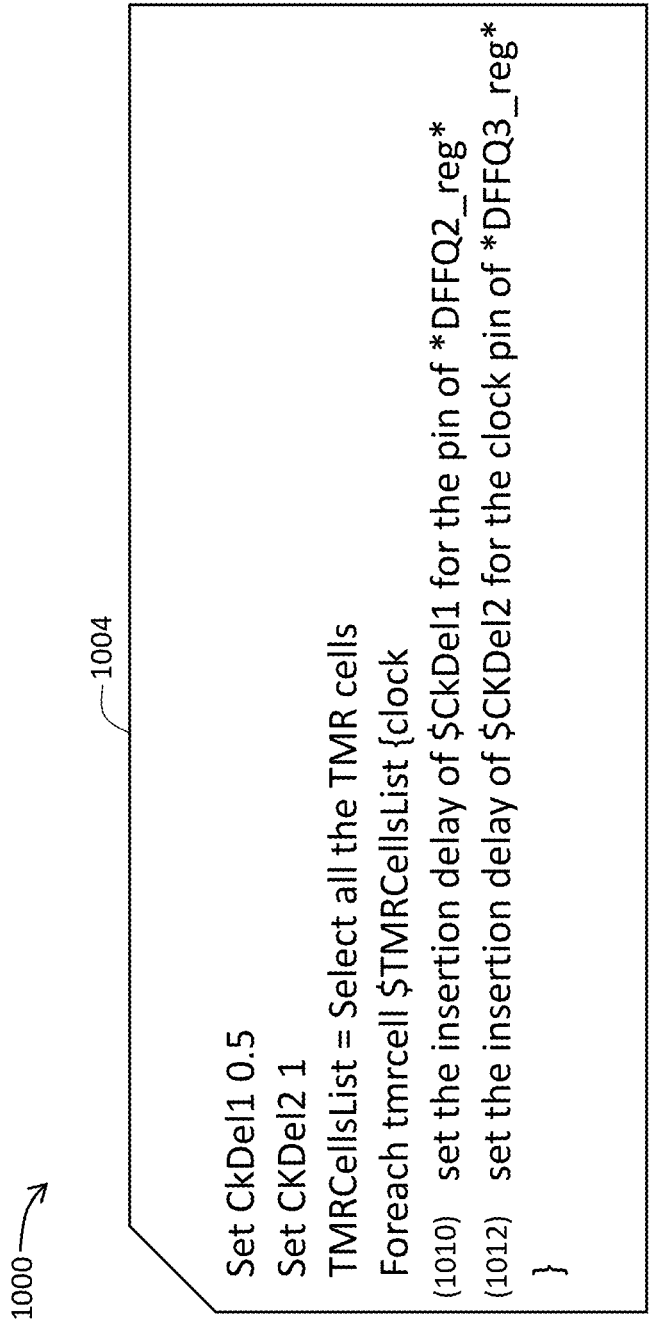
FIG. 10 is a software script implementing clock triplication delay insertion according to an embodiment of the present invention.

Referring again to FIG. 6, accomplishment of clock delay/skew insertion 648 during Clock Tree Distribution 646 according to embodiments of the present invention will now be described in detail. Referring additionally to FIG. 10, a clock delay insertion/clock triplication method 1000 may advantageously place signal driving clocks to complement each TMR module so as to ensure masking of glitches and prevent their propagation as soft errors. As shown in the exemplary script 1004 at lines 1010 and 1012, the delay commands may allow delay insertion while synthesizing the clock distribution network. For example, and without limitation, three driving clocks may be configured to introduce delays of 0 nanoseconds (ns), 0.5 ns, and 1.0 ns, respectively, to advantageously facilitate SET mitigation.

Figure 11:
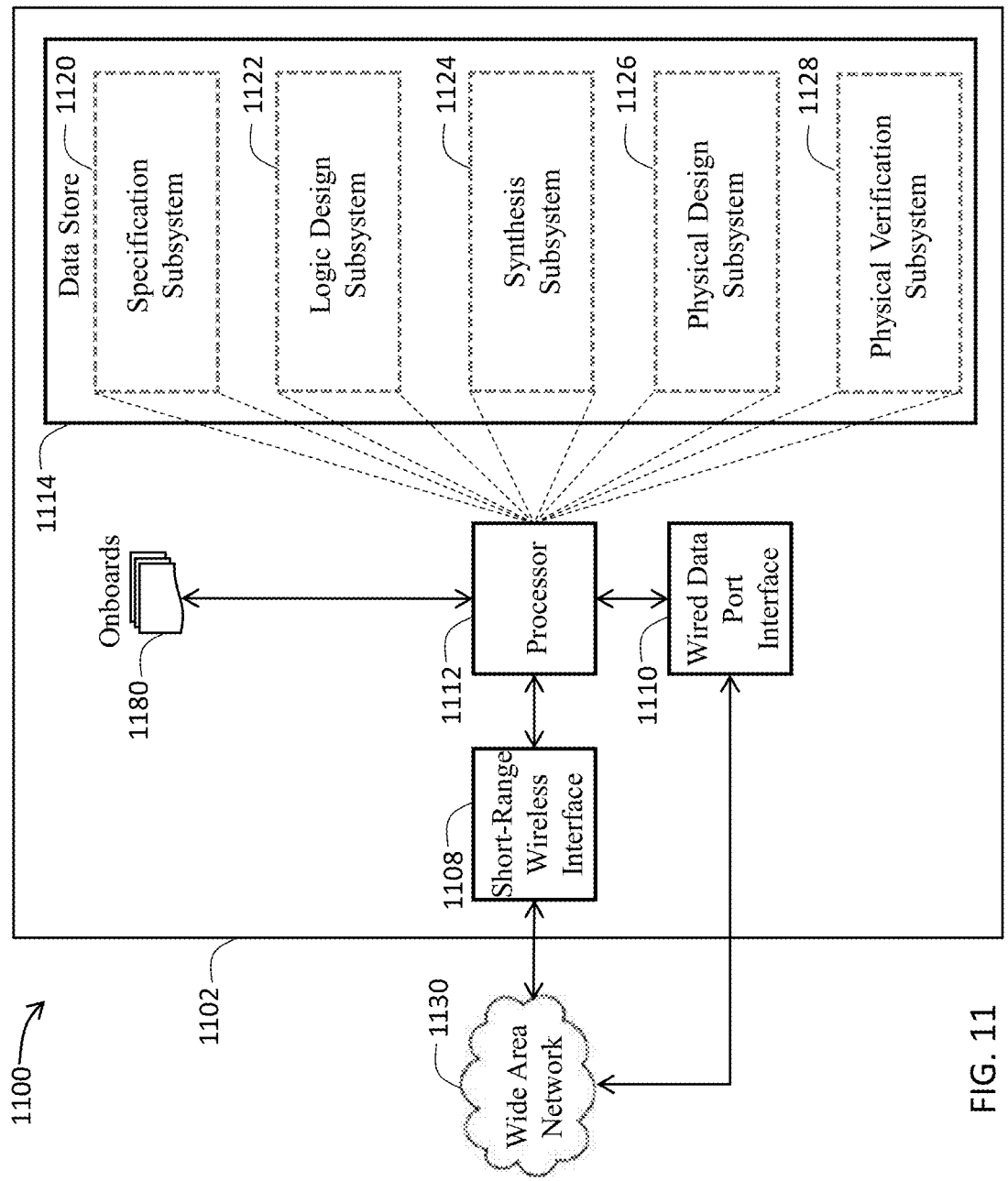
FIG. 11 is a schematic block diagram of a soft error-mitigating semiconductor design system according to an embodiment of the present invention.

Referring now to the schematic block diagram of FIG. 11, a soft error-mitigating semiconductor design system 1100, also referred to as a soft error-mitigating ASIC design system, a semiconductor design service, or a semiconductor design solution, is illustrated in accordance with an exemplary embodiment of the present invention. Those skilled in the art will understand that the principles of the present disclosure may be implemented on or in data communication with any type of suitably arranged device or system configured to automate ASIC design flow.

In the exemplary configuration shown in FIG. 11, the soft error-mitigating semiconductor design system 1100 may comprise a processor 1112 (also referred to herein as a "microprocessor" or central processing unit (CPU)) that may be operable to accept and execute computerized instructions, and also the data store 1114 that may store data and instructions used by the processor 1112. The processor 1112 may be positioned in data communication with some number of external devices and may be configured to direct input from such external devices to the data store 1114 for storage and subsequent retrieval. For example, and without limitation, the processor 1112 may be configured in data communication with downstream networking resources (e.g., a wide area network (WAN) 1130) via a short-range wireless interface 1108 (e.g., Bluetooth®) and/or via a wired data port interface 1110 (e.g., USB). Using such data interfaces, the processor 1112 may be configured to direct input received from components of the WAN 1130 to the data store 1114 for storage. Similarly, the processor 1112 may be configured to retrieve data from the data store 1114 to be forwarded as output to various components of the WAN 1130.

For example, and without limitation, the computerized instructions of the soft error-mitigating semiconductor design system 1100 may be configured to implement a Specification Subsystem 1120, a Logic Design Subsystem 1122, a Synthesis Subsystem 1124, a Physical Design Subsystem 1126, and/or a Physical Verification Subsystem 1128 that may be stored in the data store 1114 and retrieved by the processor 1112 for execution. The Specification Subsystem 1120 may be operable to implement functionality as described in design Specification phase 610 of FIG. 6 above. The Logic Design Subsystem 1122 may be operable to implement functionality as described in Logic Design phase 620 of FIG. 6 above. The Synthesis Subsystem 1124 may be operable to implement functionality as described in Logic Synthesis phase 630 (including TMR insertion 632) of FIG. 6 above. The Physical Design Subsystem 1126 may be operable to implement functionality as described in Physical Design phase 640 (including Memory Elements Spatial Separation 644 and/or Clock Delay/Skew Insertion 648) of FIG. 6 above. The Physical Verification Subsystem 1128 may be operable to implement functionality as described in Physical Verification phase 660 of FIG. 6 above.

A person of skill in the art will immediately recognize that an advantageous implementation of the soft error-mitigating semiconductor design system 1100 may employ any or all of Specification Subsystem 1120, Logic Design Subsystem 1122, Synthesis Subsystem 1124, Physical Design Subsystem 1126, and/or Physical Verification Subsystem 1128 collocated upon a single host computing device or distributed among two or more host computing devices. For example, and without limitation, the various components of the soft error-mitigating semiconductor design system 1100 may be implemented onboard an application host/server 1102.

Those skilled in the art will appreciate that the present disclosure contemplates the use of computer instructions and/or systems configurations that may perform any or all of the operations involved in ASIC design flow. The disclosure of computer instructions that include Specification Subsystem 1120 instructions, Logic Design Subsystem 1122 instructions, Synthesis Subsystem 1124 instructions, Physical Design Subsystem 1126 instructions, and/or Physical Verification Subsystem 1128 instructions is not meant to be limiting in any way. Those skilled in the art will readily appreciate that stored computer instructions and/or systems configurations may be configured in any way while still accomplishing the many goals, features and advantages according to the present disclosure.

As described above, embodiments of the present invention may advantageously mitigate SEEs manifesting as soft errors due to corruption of the data in storage nodes/registers. More specifically, embodiments of the present invention may advantageously improve the TMR automation methodology by introducing additional stages/steps during synthesis and physical design. The intended registers in the Verilog RTL may be mapped with triplicated cells during synthesis and additional constraints during placement and routing may optimize distance between memory elements in a TMR. Although the methodology is verified on a simple design, it may be advantageously scalable to large designs consisting of multi-million standard cells. Furthermore, embodiments of the present invention may relax constraints imposed on RTL engineers to make rad-hard designs, as automation introduces TMR registers, memory spacing, and clock triplication to augment the design engineer's functional requirements-driven specification.

In some embodiments, the method or methods described above may be executed or carried out by a computing system including a tangible computer-readable storage medium, also described herein as a storage machine, that holds machine-readable instructions executable by a logic machine (i.e., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

While the above description contains much specificity, these should not be construed as limitations on the scope of any embodiment, but as exemplifications of the presented embodiments thereof. Many other modifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are, unless otherwise stated, used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the following claims and their legal equivalents, and not limited by the examples given. While the invention has been described and illustrated with reference to certain fabricated embodiments thereof, those skilled in the art will appreciate that various changes, modifications and substitutions can be made therein without departing from the spirit and scope of the invention. It is intended, therefore, that the invention be limited only by the scope of the claims which follow, and that such claims be interpreted as broadly as possible.

What is claimed is:

1. A computer-implemented soft error-mitigating semiconductor design method utilizing a computer processor and a non-transitory computer-readable storage medium comprising a plurality of instructions which, when executed by the computer processor, is configured to:
   receive a circuit design specification comprising at least one sequential element definition,
   determine, using the at least one sequential element definition, a triple modular redundancy (TMR) configuration comprising three redundant sequential element definitions,
   determine, using the TMR configuration, a clock skew insertion definition and a spatial separation definition, and
   generate a layout characterized by the TMR configuration, by the clock skew insertion definition, and by the spatial separation definition;
   wherein the clock skew insertion definition comprises a single global clock signal configured to drive each of three delay logic elements each comprising a respective distinct offset.

2. A computer-implemented soft error-mitigating semiconductor design method utilizing a computer processor and a non-transitory computer-readable storage medium comprising a plurality of instructions which, when executed by the computer processor, is configured to:
   receive a circuit design specification comprising at least one sequential element definition,
   determine, using the at least one sequential element definition, a triple modular redundancy (TMR) configuration comprising three redundant sequential element definitions,
   determine, using the TMR configuration, a clock skew insertion definition and a spatial separation definition, and
   generate a layout characterized by the TMR configuration, by the clock skew insertion definition, and by the spatial separation definition;
   wherein the clock skew insertion definition comprises three clock signals each configured to drive a respective one of three delay logic elements each comprising a respective asynchronous offset.

3. The computer-implemented soft error-mitigating semiconductor design method according to claim 1, wherein the at least one sequential element definition is of a storage register type.

4. A computer-implemented soft error-mitigating semiconductor design method utilizing a computer processor and a non-transitory computer-readable storage medium comprising a plurality of instructions which, when executed by the computer processor, is configured to:
   receive a circuit design specification comprising at least one sequential element definition;
   determine, using the at least one sequential element definition, a triple modular redundancy (TMR) configuration comprising three redundant sequential element definitions and a voter element definition configured to
   receive a respective output from each of the three redundant sequential element definitions, and
   generate, using majority-voting logic, a fault-free output;
   determine, using the TMR configuration, a spatial separation definition; and
   generate a layout characterized by the TMR configuration and by the spatial separation definition.

5. A computer-implemented soft error-mitigating semiconductor design method utilizing a computer processor and a non-transitory computer-readable storage medium comprising a plurality of instructions which, when executed by the computer processor, is configured to:
   receive a circuit design specification comprising at least one sequential element definition and represented in a specification format selected from the group consisting of Verilog and Very High-Speed Integrated Circuit Hardware Description Language (VHDL);
   determine, using the at least one sequential element definition, a triple modular redundancy (TMR) configuration comprising three redundant sequential element definitions;
   determine, using the TMR configuration, a spatial separation definition; and
   generate a layout characterized by the TMR configuration and by the spatial separation definition.

6. A computer-implemented soft error-mitigating semiconductor design method utilizing a computer processor and a non-transitory computer-readable storage medium comprising a plurality of instructions which, when executed by the computer processor, is configured to:
   receive a circuit design specification comprising at least one sequential element definition;
   determine, using the at least one sequential element definition, a triple modular redundancy (TMR) configuration comprising three redundant sequential element definitions;
   determine, using the TMR configuration, a spatial separation definition configured to position each of three redundant sequential element definitions of the triple modular redundancy (TMR) using a Single Event Effect (SEE)-mitigating spacing constraint; and
   generate a layout characterized by the TMR configuration and by the spatial separation definition.

* * * * *